United States Patent

Hakulin et al.

[11] Patent Number: 5,201,172
[45] Date of Patent: Apr. 13, 1993

[54] METHOD FOR TREATING BLACK LIQUOR

[75] Inventors: Bertel K. Hakulin, Helsinki; Erkki J. Kiiskilä; Marjo Kuusio, both of Karhula, all of Finland

[73] Assignee: A. Ahlstrom Corporation, Noormarkku, Finland

[21] Appl. No.: 787,901

[22] Filed: Nov. 5, 1991

[30] Foreign Application Priority Data

Nov. 7, 1990 [FI] Finland .................................. 905507

[51] Int. Cl.$^5$ .............................. F02C 3/28; F02C 6/00
[52] U.S. Cl. .................................. 60/39.05; 60/39.12; 162/30.11
[58] Field of Search .................. 60/39.02, 39.05, 39.12, 60/39.182, 39.53, 39.55; 162/29, 30.11, 31

[56] References Cited

U.S. PATENT DOCUMENTS

| | | | |
|---|---|---|---|
| 4,682,985 | 7/1987 | Kohl | 48/197 |
| 4,909,899 | 3/1990 | Kilskila | 159/47.3 |
| 4,929,307 | 5/1990 | Kiiskilä et al. | 159/47.3 |

Primary Examiner—Louis J. Casaregola
Attorney, Agent, or Firm—Nixon & Vanderhye

[57] ABSTRACT

A method and apparatus for recovering black liquor chemicals and heat in a sulphate pulp process. The black liquor is concentrated in an evaporation plant, which includes a pressure heating reactor, after which the black liquor is gasified or combusted in a reactor for producing hot gases. The hot gases formed in the reactor are introduced into gas turbine power plant. The exhaust gases from the gas turbine are introduced into a waste heat boiler, where steam is generated for a steam turbine power plant. Secondary steam is led from the pressure heating reactor as injection steam into the gas turbine, to control inlet temperature.

20 Claims, 1 Drawing Sheet

METHOD FOR TREATING BLACK LIQUOR

BACKGROUND AND SUMMARY OF THE INVENTION

The present invention relates to a method and apparatus for treating black liquor of sulphate pulp processes for recovering chemicals and heat therefrom. The method includes the steps of gasifying and/or combusting black liquor in a pressurized gasification or combustion reactor. Molten and/or solid salts produced in the gasification and/or combustion are introduced into a dissolving tank for recovery of the cooking chemicals, and the gases formed in the process are conducted through a purification stage and then into a gas turbine, for recovering the energy from the gases. From the gas turbine, the exhaust gases are fed into a waste heat boiler where their residual energy is recovered as high pressure steam, which is utilized in a steam turbine power plant. Secondary steam from the sulphate pulping process is injected into the gas turbine (e.g. into a combustor associated therewith) to control the turbine inlet temperature.

Recovery of cooking chemicals and heat recovery are essential aspects of sulphate pulp production. In present pulp mills, the recovery process is usually effected by combusting black liquor in a recovery boiler. The chemical substance is recovered in a soda smelt and the organic substance, dissolved from wood, burns, thereby generating heat, which is recovered by means of heat transfer surfaces arranged in the boiler. It has also been suggested to recover chemical substance by gasifying black liquor. Besides molten chemical substance, gas of high thermal value is generated in the gasifier, which gas may be employed, e.g., in a gas turbine.

The dry solids content of the black liquor obtained from the pulp washing stage after cooking is only about 15 to 20%. It cannot, as such, be introduced into a recovery boiler or a gasifier to be either combusted or gasified. Therefore, an evaporation plant in the pulp mill concentrates the black liquor to such an extent that the dry solids content is high enough for combustion or gasification. To obtain as much energy as possible from the black liquor, it is concentrated to the highest possible dry solids content. With the present technique, it is about 65-80%.

The thermal power required for evaporation is obtained from the steam or hot flue gases formed in the process. In many modern plants, evaporation is effected in heat exchangers by using steam from a recovery boiler.

An increase in the dry solids content adds to the heat consumption of the evaporation plant because the amount of water to be evaporated is larger. The increase in heat generation in the combustion process is, however, much higher than the additional heat required for evaporation and, therefore, more valuable. The additional heat thus generated in the recovery boiler can be recovered as high pressure steam.

Formerly, several recovery boilers were constructed so that the final concentration of liquor was effected by means of a direct flue gas evaporator or a cyclone evaporator. The reason for that was that evaporation to a dry solids content of >50% in a heat exchanger was found difficult because the heat transfer surfaces were badly fouled. Direct flue gas evaporation, however, has some drawbacks, such as:

smell and emissions from evaporators, the conversion efficiency of steam generation in the boiler decreases, and it is not possible to utilize the secondary steam exhausted from the evaporator as the evaporation takes place in one stage only.

Due to the drawbacks mentioned above, recovery boilers arranged with direct flue gas evaporation systems have later been modified so as to effect the final cooling of flue gases in water preheaters and the final concentration of liquor in additional evaporator units.

The above-identified drawbacks may be partly avoided by a system for final concentration of liquor as suggested in U.S. Pat. No. 4,909,899. In that system, waste liquor is heated by flue gases formed in pressurized combustion, in an indirect heat exchange, utilizing the heat content of the flue gases after boiler. Flue gas heating takes place at a concentration such that liquor does not yet adhere to the heat transfer surfaces. Thereafter, the heated, pressurized liquor is allowed to expand to a lower pressure, whereby water evaporates from the liquor, which becomes concentrated. This concentration takes place in a separate means having no heat transfer surfaces which would become fouled. It has been suggested that the secondary steam thereby generated could replace the primary steam of the evaporation plant connected in series. In this way, liquor may be heated from the temperature of 80°-120° C. to 160°-250° C. and be concentrated to a dry solids content of >55%. However, sulphur emissions of the recovery boiler and evaporation plant cannot be avoided.

Sulphur emissions of a sulphate pulp mill primarily originate in the recovery boiler, evaporation plant, and cooking plant. It has been established that an increase in the black liquor dry solids content, achieved by evaporation, decreases sulphur emissions of the flue gases of the recovery boiler. The sulphur content of green liquor, on the contrary, increases as a result of increased dry solids content and, consequently, also the sulphur content of both white liquor (sodium hydroxide and sodium sulfide) and black liquor increase. There is also reason to believe that the sulphur emissions of the evaporation plant increase due to a higher sulphur content of black liquor.

As energy prices continue to increase, it has become more and more important to have a high conversion efficiency in power generation in the recovery of chemicals. The heat of combustion gases formed in the combustion of black liquor in the recovery boiler must be primarily recovered as steam. To avoid corrosion of the boiler, the p and T values of the steam have to be relatively low, which means that the best possible conversion efficiency is not provided in power generation. The high pressure steam generated is introduced into a back-pressure steam turbine and the steam from the exhaust side is used for covering the heat demand of the pulp mill. The turbine and a generator connected thereto generate the electricity required by the mill. However, the conversion efficiency in electricity generation is only about 20 to 25%. The recovery boiler has developed into a reliable regeneration and energy generation process, but the ratio of heat to electricity given thereby is disadvantageous in present sulphate pulp mills. Today, the heat generation in recovery boilers very well meets the present demand, due to lower heat consumption in the pulp mill processes, but electricity is generated with a poor conversion efficiency.

In pulp production, the trend is also such that steam consumption no longer increases, whereas electricity consumption still increases, especially in integrated pulp and paper mills.

The aspects described above have spurred long-term studies on how the conventional recovery boiler could be replaced by new processes, such as black liquor gasification. A large number of alternatives are being researched. Common to the suggested new processes is the concept of separating regeneration of chemicals from the energy production, and to adapt the fuel produced to combined power plants.

Black liquor may be gasified in many different ways. Popular methods under examination are, for example, solid phase gasification and molten phase gasification. The gas produced in gasification may be combusted either in a conventional boiler or in a pressurized combined process in order to generate steam and electricity. Finnish patent application 841540 and U.S. Pat. No. 4,682,985 suggest pressurized gasification of black liquor, which offers an opportunity of applying combined power plant technology in the power generation at the pulp mill. According to that method, gasification produces combustible gas and the sulphur content of black liquor is converted substantially to sulphide. The black liquor (45 to 75% solids) is introduced into the gasifier as an aqueous solution. The gas produced in the gasification is purified and combusted in order to receive hot flue gases, which are then utilized for electricity generation in the gas turbine. The exhaust gases from the gas turbine are fed into a waste heat boiler, where the heat of the exhaust gases is used to generate steam for the steam turbine plant. Besides electricity, the steam turbine system generates process steam.

Aqueous black liquor is introduced into the upper section of the gasifier as fine drops. Prior to gasifying, the black liquor drops dry in the hot gas flow rising upwardly from the bottom of the gasifier. The solid or molten salt residue of the gasified black liquor accumulates on the lower section of the gasifier and is further introduced into a dissolving tank to recover cooking chemicals. The water evaporated from the black liquor as well as other evaporating substances are entrained with the product gas, flowing out of the gasifier from the upper section thereof.

Thus, the gas from the gasifier contains both gas produced by gasification of black liquor and water evaporating from the black liquor being concentrated, and/or other evaporable alkali and sulphur compounds. Harmful substances have to be separated from the gases prior to leading the gases into the gas turbine. The gases are led, for example, into an absorption tower, where sulfur compounds are removed therefrom and thereafter, e.g., into a wet scrubber for final purification.

A drawback of the black liquor gasification system suggested above is the high content of water vapor in the gases. The more water vapor the gas contains, the poorer its combustion properties and the conversion efficiency in electricity generation in the gas turbine are. Furthermore, a large volume of exhaust gases thereby produced requires extensive gas purification systems which, at the same time have to purify both the gases produced in evaporation and the gases produced in gasification in order to remove harmful substances from the gases prior to introducing them into the gas turbine. The gas purification cost will be considerable.

The conversion efficiency in electricity generation at a gas turbine is usually also lowered by a relatively large volume of air needed in the gas turbine for lowering the inlet temperature. This increases the power requirement of the compressor, thereby lowering the conversion efficiency in electricity generation at the gas turbine.

According to the invention there is provided an improved method of recovering chemicals and heat from black liquor so that the above-described drawbacks relating to prior art recovery methods are minimized. A method and apparatus are provided for recovering chemicals and heat from black liquor with the best possible conversion efficiency in electricity generation. An improved method of temperature regulation of the gas turbine in a black liquor heat recovery plant is also provided, as is a method of minimizing the harmful emissions caused by final evaporation of black liquor.

It is a main characteristic feature of the method of the invention for recovering chemicals and heat from black liquor in a sulphate pulping process, in which black liquor is gasified (and/or combusted) and gases are expanded in a gas turbine for electricity generation, that pressurized secondary steam from a sulphate pulp process is introduced as injection steam into the gas turbine (e.g. to the combustor, to the combustion gases therein), prior to the gas turbine vanes, for regulating the gas turbine inlet temperature. This secondary steam formed in the sulphate pulp process is secondary steam from, e.g., the cooking plant, expansion stage, drying section, or the evaporation plant. The secondary steam is preferably pressurized to the pressure level of the gas turbine.

According to another aspect of the present invention, an apparatus is provided for recovering heat and chemicals from black liquor. The apparatus comprises: Black liquor evaporator means for concentrating the solids content of black liquor. A pressurized reactor for gasifying or combusting the black liquor concentrated in the evaporator means. Gas purification means for purifying the gas formed in the pressurized reactor. A gas turbine power plant for recovering the energy from the purified gas, and having an inlet and turbine vanes, and producing exhaust gas. A waste heat boiler for heat recovery from the gas turbine power plant exhaust gas as pressurized steam. A steam turbine power plant for recovering the energy from the steam generated in the waste heat boiler. A pressure heating reactor, serving as an evaporator of black liquor, and for producing secondary steam from a sulphate pulping process. And, means for introducing the secondary steam from the pressure heating reactor as injection steam to the gas turbine prior to the gas turbine vanes, for regulating the gas turbine inlet temperature.

As a considerable amount of secondary steam is generated especially in the evaporation plant and in connection with pressurized heating of black liquor prior to gasification (or combustion), the invention will be explained with reference to arrangements where black liquor is pressure-heated prior to gasification or combustion and here the secondary steam generated in the pressure heating stage is introduced into the gas turbine for lowering its inlet temperature.

In accordance with a preferred embodiment of the invention, black liquor is evaporated by conventional evaporation and pressure heating methods to a high dry solids content. Thereafter, black liquor is gasified and the energy content of the gases thereby formed is recovered in a combined gas turbine and steam turbine power plant. The secondary steam generated in the pressure heating, which contain water and other evaporable components, are introduced into the gas turbine combustor for regulating the temperature of the combustion gases formed therein to be suitable prior to leading the combustion gases to the turbine vanes. Steam required by the black liquor pressure heating reactor is received from the steam turbine.

The method of the invention provides an advantageous way of recovering the secondary steam exhausted from the reactor, or other source of sulphate process secondary steam. This is effected by injecting it as injection steam into the gas turbine. Feeding of secondary steam into the gas turbine reduces the volume of excess air normally required for temperature regulation of the gas entering the gas turbine vanes. This reduces the power requirement of the compressor, and the process becomes more effective.

In the method in which the black liquor is combusted instead of being gasified, the secondary steam from pressure heating and the flue gases from combustion may be combined prior to introducing them into the gas turbine. In this way, the volume of gas passing through the gas turbine and, consequently, also electricity generation is increased. Combining the secondary steam with the flue gases provides an advantageous purification system of secondary steam in a combined secondary steam and flue gas cleaner.

The pressure heating process, i.e., heat treatment of black liquor, may be arranged in some intermediate stage of evaporation or immediately before gasification or combustion. In pressure heating, the black liquor temperature is raised to a level above the cooking temperature, preferably to 170°-200° C. for splitting the macromolecular lignin fractions contained in the black liquor, such as shown in U.S. Pat. No. 4,929,307, the disclosure of which is hereby incorporated by reference herein. Compounds containing sulphur or alkali are easily evaporated from the black liquor in a pressure heating process. The most economic heating system may be chosen, e.g., direct or indirect steam heating or some other heating system, such as electrical heating. Reheat steam from a steam turbine power plant is preferably used as a heat source in pressure heating. The viscosity of black liquor may be lowered by pressure heating, which improves black liquor treating properties and evaporability as well as helps in transferring liquor from one stage to the other. Thus, pressure heating enables evaporation of liquor to the highest possible dry solids content, whereby the efficient combustion value of the black liquor rises and the conversion efficiency of electricity generation in the combined gas turbine and steam turbine power plant also increases. An increase in the dry solids content of the black liquor increases the effective gas flow from the gasifier or recovery boiler. Thereby, the electricity generation in the gas turbine increases as well as the steam generation in the waste heat boiler and consequently, also the electricity generation in the steam turbine.

In a combined power plant, the excess secondary steam generated in pressure heating may be converted to electric power by injecting the secondary steam into the gas turbine as injection steam. Injection steam is fed to the combustion gases in the gas turbine combustor. The pressure of the secondary steam has to be high enough for a successful feed into the pressurized gas. The steam injection also improves the conversion efficiency of electricity generation and the efficiency of the gas turbine and reduces the need for excess air to be introduced into the gas turbine by the compressor. In a gas turbine where the excess air level has been about 1.4, it may be lowered to about 1.15 by practicing the secondary steam injection of the invention.

A change in the volume of air which has to be compressed in the compressor is an important parameter for the process. Injection of secondary steam into the combustion gas entering the gas turbine according to the invention also lowers the temperature of the combustion gas. The temperature of the gas entering the gas turbine vanes can be maintained constant by means of steam injection. Thereby, the amount of excess cooling air compressed in the compressor can be decreased in proportion to the injected steam. In several gas turbines, the compressor is provided with a set of adjustable guide vanes. The output from the compressor may be adjusted by means of such vanes. An economic adjustment range is rather narrow, from 80 to 100%. The gas turbine may also be operated within another adjustment range, but in that case the combustion gas temperature probably decreases when the steam injection increases.

The secondary steam introduced into the gas turbine normally should be cleaned prior to being fed into the turbine. The secondary steam from pressure heating contains, e.g., sulphur and alkali compounds and possibly also other substances harmful to the gas turbine. The gases from the gasification stage also should be purified. The gas flows are purified separately, which means that it is possible to use the most suitable purification method for the different harmful compounds of the secondary steam and the gas respectively. The gas purification processes may, however, be connected so that both systems use, for example, the same absorption mass. The actual purification takes place in separate equipment, but regeneration of the absorption mass may be effected in one and the same equipment, which saves costs. Purification of the secondary steam in separate equipment provides efficient purification of a small secondary steam flow with relatively simple means. Sulphur compounds are easier to remove from small quantities of secondary steam than from large quantities of combined steam and gas. Further, it is advantageous to remove sulphur compounds from the secondary steam prior to the sulphur compounds coming into contact with air in the gas turbine combustor. The pressurized secondary steam flow is relatively small and therefore also the plant needed for its purification. It is advantageous for the entire process if the gases may be purified at the highest possible temperature, whereby the heat energy contained in the gas may be utilized in the gas turbine.

Pressure heating may be effected at the same pressure as gasification or combustion, e.g., at about 20 bar. However, based on the values of the steam used for the heat treatment, the heat treatment may be arranged at a pressure which is either lower or higher than the pressure of the gasifier. Before introducing the gas into the gas turbine combustor, the pressure of the secondary steam from the heat treatment should be adjusted by a pressure relief valve, or by raising the pressure.

Pressure heating of black liquor and use of secondary steam as injection steam according to the invention is especially suitable for gasification of black liquor because the high dry solids content of black liquor has a very positive effect on the gasification of liquor. Thus, lowering the viscosity of the liquor by means of pressure heating contributes to the gasification process.

Gasification of black liquor having a high dry solids content produces gas of high heat value, which may be utilized effectively in a combined gas turbine and steam turbine power plant. The gasification is preferably effected at a high temperature, whereby the inorganic substance of the black liquor is discharged from the reactor in a molten form, and the smelt may be further treated in a conventional manner.

DETAILED DESCRIPTION OF THE DRAWING

Figure 1:
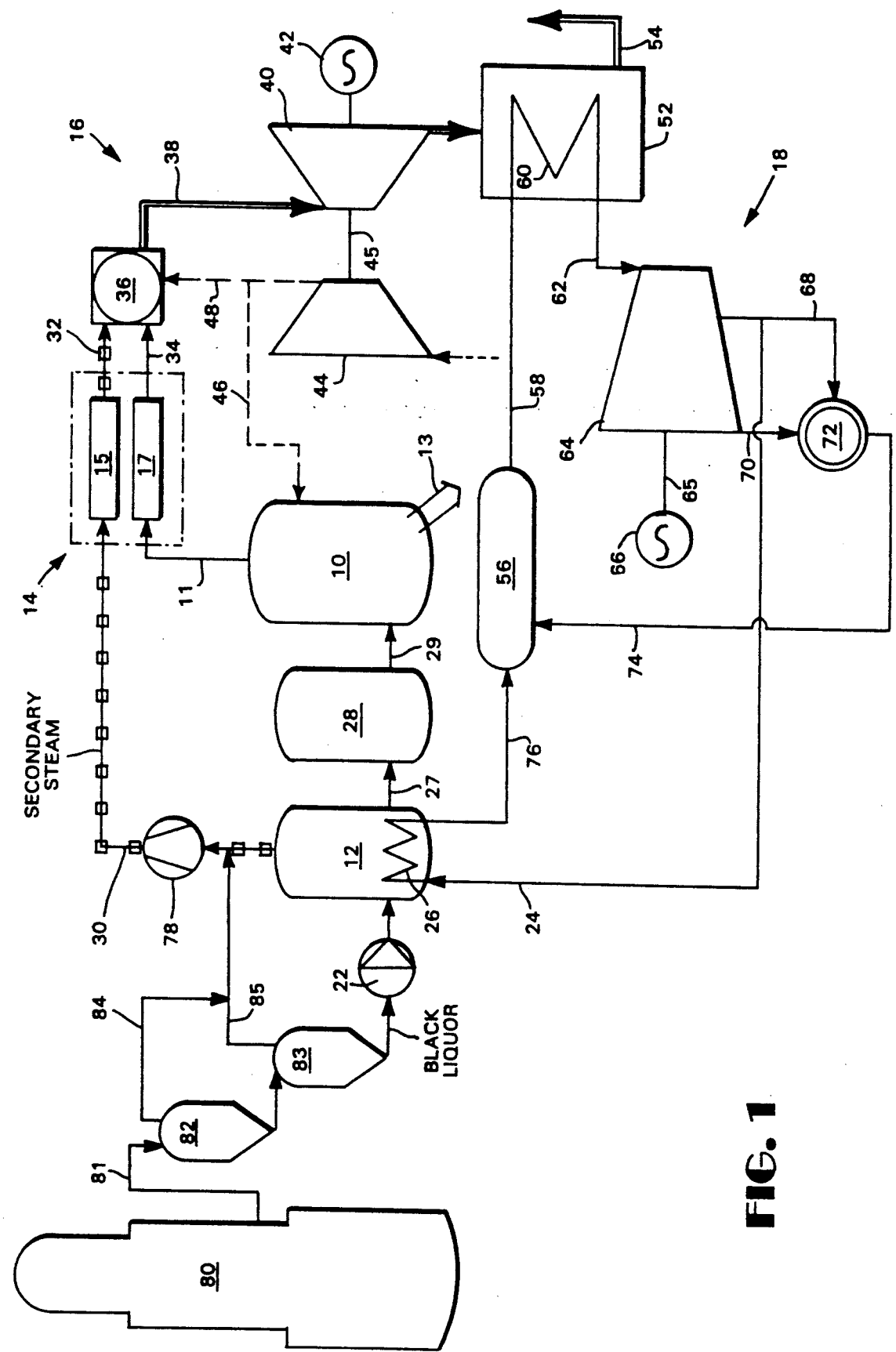
FIG. 1 is a schematic of exemplary apparatus according to the invention, for treating black liquor from a sulphate pulp process for recovering chemicals and heat therefrom.

The exemplary gasification plant of FIG. 1 comprises a black liquor gasification reactor 10, a pressure heating means 12 (see U.S. Pat. No. 4,929,307), gas purification means 14, gas turbine power plant 16, and a steam turbine power plant 18.

Black liquor is fed by pump 22 into the pressure heating reactor 12. In the pressure heating reactor 12, black liquor is heated indirectly by leading reheat steam by duct 24 from the steam turbine power plant into a heat exchanger 26. The black liquor is heated to a temperature of, e.g, 180°-200° C. The pressure is about 10 to 20 bar in the pressure heating reactor 12.

Concentrated black liquor is led by duct 27 from the pressure heating stage to a final evaporation stage 28 and further, via duct 29, into the gasifier 10. The water evaporated from the black liquor as well as other easily gasified components are introduced via duct 30 into a steam purification means 15, where sulphur and other substances, such as alkali compounds, which are harmful to the gas turbine power plant are preferably removed from the secondary steam. Removal may take place in purifier 15 by adsorption or absorption.

The gases formed in the gasifier 10 are led via duct 11 into a gas purification plant 17, where they are cleaned separately from the secondary steam coming from the pressure heating stage 12. The same absorption mass may be provided in the structures 15, 17. The smelt (molten and/or solid salts) formed in the gasifier 10 is drained off through a chute 13 and led to a dissolving tank to recover cooking chemicals therefrom, as is conventional.

From the gas purification plant 14, both the purified steam and the gas flow are taken through ducts 32 and 34 into a gas turbine combustor 36 for producing hot combustion gases. The secondary steam flow from duct 32 cools combustion gases produced in the combustor 36. The combustion gases and the secondary steam entrained therewith are led via duct 38 from the combustor 36 into a conventional gas turbine 40 having vanes (not shown) therein. Thus the secondary steam from a sulphate pulping process is introduced as injection steam prior to the gas turbine vanes, to regulate the gas turbine inlet temperature. A generator 42 for generating electricity and a compressor 44 for producing compressed air, are mounted on the same shaft 45 as the gas turbine 40. Compressed air is conducted via duct 46 from the compressor 44 into the gasifier 10 and via duct 48 into the combustor 36.

The exhaust gases from the gas turbine 40 are led via duct 50 into a waste heat boiler 52 for utilizing the residual heat of the gases for steam generation. The cooled gases are led from the waste heat boiler 52 via duct 54 into a stack, to be exhausted to the environment, and perhaps have heat recovered therefrom.

In the steam turbine system 18, feed water is led by duct 58 from a feed water tank 56 into a steam generator 60 arranged in the waste heat boiler 52. The high pressure steam generated in the steam generator 60 is led via duct 62 into a steam turbine 64. A generator 66 for electricity generation is mounted on the same shaft 65 as the steam turbine 64. Reheat steam is taken out of the steam turbine 64 and led via duct 24 into the pressure heater 12. Low pressure steam and possibly reheat steam is conducted from the steam turbine 64 via ducts 68 and 70 to means 72, from which the condensate is recirculated to the feed water tank 56 via duct 74. Also the condensed steam from the heat exchanger 26 is conducted via duct 76 into the feed water tank 56.

The pressure in the gasifier 10 is preferably equal to the pressure in the pressure heating plant 12. In the embodiment of FIG. 1, the pressure in the gasifier 10 is, however, higher than the pressure in the pressure heating plant 12, whereby a pressure raising means 78 is arranged after the pressure heating plant 12 for increasing the pressure of the secondary steam from plant 12 to the level of the pressure of the gas coming from the gasifier 10.

The secondary steam may come from other parts of the sulphate pulping process besides the reactor 12. For example, the secondary steam may come from the cooking plant. e.g., black liquor is withdrawn from continuous digester 80 in line 81, and passed to flash tanks 82, 83. The steam in lines 84, 85 is preferably passed through purifier 15, most desirably being pressurized in device 78 prior to passage to purifier 15. Other sources of secondary steam from the sulphate pulp process are the expansion stage, drying section, or other parts of the evaporation plant (e.g. a conventional evaporator).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of treating black liquor from a sulphate pulp process, for recovering chemicals and heat therefrom, utilizing a gas turbine having vanes and preceded by a combustor, a waste heat boiler, and a steam turbine power plant, comprising the steps of:
   (a) evaporating black liquor from a sulphate pulp process to produce a concentrated black liquor having a higher dry solids content;
   (b) gasifying and/or combusting the concentrated black liquor to produce hot gases and molten and/or solid salts;
   (c) recovering sulphate cooking chemicals from the molten and/or solid salts;
   (d) purifying the hot gases;
   (e) introducing purified hot gases into the combustor for the gas turbine, and then into the gas turbine, in order to recover energy from the hot gases, the gas turbine producing exhaust gases;
   (f) introducing the exhaust gases into the waste heat boiler to effect generation of steam;
   (g) recovering energy from the waste heat boiler steam in the steam turbine power plant;

(h) pressurizing secondary steam from the sulphate pulp process; and (i) introducing the pressurized secondary steam as injection steam prior to the gas turbine vanes, to regulate the gas turbine inlet temperature.

2. A method as recited in claim 1 comprising the further step of purifying the secondary steam from the sulphate pulp process prior to the practice of step (i).

3. A method as recited in claim 1 wherein the secondary steam from the sulphate pulp process is obtained by pressure heating the black liquor prior to step (a).

4. A method as recited in claim 3 wherein said step of pressure heating the black liquor is practiced by passing the black liquor into heat exchanging contact with hot steam.

5. A method as recited in claim 4 wherein said step of pressure heating the black liquor by passing it in heat exchanging contact with hot steam is practiced by supplying reheat steam from the steam turbine power plant into contact with the black liquor.

6. A method as recited in claim 3 wherein said pressure heating step is practiced at a temperature of between about 180°-200° C.

7. A method as recited in claim 1 wherein step (i) is practiced by introducing the secondary steam into the gas turbine combustor into contact with the purified hot gases.

8. A method as recited in claim 1 comprising the further steps of utilizing the gas turbine to compress air, and introducing the air compressed thereby into the combustor, and utilizing the air compressed thereby in the practice of step (b).

9. A method as recited in claim 2 wherein said step of purifying the secondary steam is accomplished by removing sulfur and alkali compounds from the secondary steam.

10. A method as recited in claim 2 wherein step (d) and said step of purifying the secondary steam are practiced by passing the hot gases and secondary steam into contact with separate absorption devices.

11. A method as recited in claim 10 comprising the further step of providing the same absorption mass for the separate absorption devices so as to minimize costs and facilitate ease of regeneration of the absorption mass.

12. A method as recited in claim 1 wherein the secondary steam is provided from the cooking plant.

13. A method of treating black liquor from a sulphate pulp process, for recovering chemicals and heat therefrom, utilizing a gas turbine having vanes and preceded by a combustor, a waste heat boiler, and a steam turbine power plant, comprising the steps of:

(a) evaporating black liquor from a sulphate pulp process to produce a concentrated black liquor having a higher dry solids content;

(b) gasifying and/or combusting the concentrated black liquor to produce hot gases and molten and/or solid salts;

(c) recovering sulphate cooking chemicals from the molten and/or solid salts;

(d) purifying the hot gases;

(e) introducing purified hot gases into the combustor for the gas turbine, and then into the gas turbine, in order to recover energy from the hot gases, the gas turbine producing exhaust gases;

(f) introducing the exhaust gases into the waste heat boiler to effect generation of steam;

(g) recovering energy from the waste heat boiler steam in the steam turbine power plant;

(h) purifying secondary steam from the sulphate pulp process; and (i) introducing the purified secondary steam as injection steam in the combustor prior to the gas turbine vanes, to regulate the gas turbine inlet temperature.

14. A method as recited in claim 13 wherein the secondary steam from the sulphate pulp process is obtained by pressure heating the black liquor prior to step (a).

15. A method as recited in claim 14 wherein said step of pressure heating the black liquor is practiced by passing the black liquor into heat exchanging contact with hot steam.

16. A method as recited in claim 15 wherein said step of pressure heating the black liquor by passing it in heat exchanging contact with hot steam is practiced by supplying reheat steam from the stem turbine power plant into contact with the black liquor.

17. A method as recited in claim 13 wherein step (i) is practiced by introducing the secondary steam into the gas turbine combustor into contact with the purified hot gases.

18. A method as recited in claim 13 comprising the further steps of utilizing the gas turbine to compress air, and introducing the air compressed thereby into the combustor, and utilizing the air compressed thereby in the practice of step (b).

19. A method as recited in claim 13 comprising the further step of purifying the secondary steam from the sulphate pulp process prior to the practice of step (i).

20. A method as recited in claim 14 wherein said step of purifying the secondary steam is accomplished by removing sulfur and alkali compounds from the secondary steam.

* * * * *